United States Patent [19]

Rampel et al.

[11] Patent Number: 5,248,571
[45] Date of Patent: Sep. 28, 1993

[54] CADMIUM ELECTRODE AND CELL HAVING ANTI-AGGLOMERATION CHARACTERISTICS

[75] Inventors: Guy G. Rampel; Herschel D. Johnson, both of Gainesville, Fla.

[73] Assignee: Gates Energy Products, Inc., Gainesville, Fla.

[21] Appl. No.: 589,308

[22] Filed: Sep. 27, 1990

[51] Int. Cl.⁵ .......................... H01M 4/44; H01M 4/26
[52] U.S. Cl. ................................ 429/206; 429/222; 29/623.5; 427/123
[58] Field of Search ............... 429/206, 222; 29/623.5; 427/123

[56] References Cited

U.S. PATENT DOCUMENTS

| | | | |
|---|---|---|---|
| 2,870,234 | 1/1959 | Moulton | 429/222 |
| 3,751,300 | 8/1973 | Yamamoto et al. | 156/327 |
| 3,870,562 | 3/1974 | Catherino | 429/222 |
| 3,877,985 | 4/1975 | Rampel | 429/222 |
| 3,954,501 | 5/1976 | Rampel | 429/222 |
| 4,765,799 | 8/1988 | Waldrop | 429/222 |
| 5,064,735 | 11/1991 | Rampel et al. | 429/206 |

FOREIGN PATENT DOCUMENTS

| | | | |
|---|---|---|---|
| 52-031348 | 3/1977 | Japan | |
| 54-106830 | 8/1979 | Japan | |
| 58-032363 | 2/1983 | Japan | 429/222 |
| 58-186163 | 10/1983 | Japan | 429/222 |
| 60-003859 | 1/1985 | Japan | 429/222 |
| 60-023961 | 2/1985 | Japan | 429/222 |
| 60-211766 | 10/1985 | Japan | 429/222 |
| 0862092 | 3/1961 | United Kingdom | |

*Primary Examiner*—Mark L. Bell
*Assistant Examiner*—Anthony J. Green
*Attorney, Agent, or Firm*—J. L. Isaac; C. H. Castleman; H. W. Oberg

[57] ABSTRACT

A cadmium electrode for use in a rechargeable cell employing an alkaline electrolyte is disclosed. The electrode includes an electrically conductive substrate supporting an electrochemically active cadmium material. In addition, an effective amount of a nonionic, water soluble glycoside-based surfactant is added to retard cadmium agglomeration during operation of the electrode. Finally, a process for making such an electrode is also disclosed.

46 Claims, 5 Drawing Sheets

CADMIUM ELECTRODE AND CELL HAVING ANTI-AGGLOMERATION CHARACTERISTICS

BACKGROUND OF THE INVENTION

1. Field of the Invention

This invention relates generally to cadmium negative electrodes for use in electrochemical cells and the process of manufacture thereof and, more particularly, to flexible cadmium electrodes which are capable of being wound in a jelly-roll configuration for use in rechargeable nickel-cadmium alkaline cells. Specifically, the present invention relates to an improved cadmium electrode and cell having enhanced anti-agglomeration characteristics.

2. Description of the Prior Art

The typical known cadmium electrode consists of a mixture of cadmium oxide, cadmium hydroxide, cadmium metal, a minor amount of nickel hydroxide to retard cadmium agglomeration and capacity fade, and a binder to provide integrity to the mixture and secure attachment to an electrically conductive substrate. In preparing pasted cadmium electrode plates, it has been common practice to use a water soluble or water dispersible resin as the binder for the electrochemically active material. However, use of water to blend the electrochemically active ingredients with the binder has several drawbacks. A principal drawback in that the water reacts with cadmium oxide to form the corresponding hydroxide which is of lower density. The result is a reduction in capacity of the electrode as well as pollution of process water. The hydroxide form presents the further drawback in that it reacts with air on stand to form the undesirable carbonate species. Water in the presence of air also promotes conversion of the cadmium metal to cadmium hydroxide.

Perhaps the best prior art non-sintered cadmium electrodes have been made using polytetrafluoroethylene (PTFE) dispersible resin in water. The PTFE binder holds the electrode mass together by a series of fibrillate fibers throughout the active mass and serves to enhance recombination of oxygen at the negative cadmium electrode on charge and overcharge. It is also known to catalyze this oxygen recombination reaction by impregnating the active mass of the cadmium electrode with sub-microscopic silver particles, as taught in U.S. Pat. No. 3,877,985 (Rampel). Typically, this type of Teflon bonded electrode has been prepared according to the teachings of U.S. Pat. No. 3,954,501 (Rampel), the disclosure of which is herein incorporated by reference. In this process cadmium oxide is hydrated to typically about 70 percent. Nickel hydroxide up to about 2.0 weight percent is also added to retard cadmium agglomeration (densification) as taught in U.S. Pat. No. 3,870,562 (Catherino). Nevertheless, cycle life of sealed nickel-cadmium cells incorporating these cadmium electrodes is limited primarily by the agglomeration phenomenon to about 250 cycles in certain applications. The agglomeration causes a gradual reduction of the active electrode surface area due to densification of the cadmium metal (charge state) as well as to change in the size of cadmium hydroxide crystals. Thus, the effective current density gradually increases, and the capacity of the cell measured in ampere hours (Ah) deliverable to a fixed cut-off voltage decreases. For applications requiring long cycle life, the usefulness of this known cell is limited accordingly.

Japanese patent publication no. 57-174864 assigned to Matsushita recognizes the disadvantages of transformation of cadmium oxide to cadmium hydroxide when employing water soluble pastes. This patent publication discloses the use of poly (vinyl) alcohol as a binder dispersed in ethylene glycol or propylene glycol non-aqueous solvents. The strength and conductivity of this electrode are improved by adding resin or metal fibers to the paste. However, these fibers are acknowledged to increase the difficulty of extruding or slurry coating the electrode substrate as it is pulled through a slit. The fibers used include acrylonitrile-vinyl chloride copolymer, polyamide and polyvinylchloride as resin fibers, and steel, nickel, and nickel plated resin fiber as metal fibers. The capacity of the resultant electrode is disclosed as 75 mAh/cm$^2$.

Japanese patent publication no. 52-31348 assigned to Furukawa discloses a method for preparing a cadmium electrode including the steps of filling and then drying a paste formed by mixing a powdered cadmium active material, a binder solution, and a lower melting point nylon powder composed of a copolymer of nylon 6, nylon 66 and nylon 12, in a substrate, and heating the paste at a temperature exceeding the melting point of the lower melting point nylon whereupon the nylon powder is melted to bind the active material powders. It is believed this method will fail to produce an electrode with satisfactory dispersion of the nylon, and that the in situ melted nylon will mask the activity of the cadmium. Most importantly this reference does not disclose use of a material which will retard cadmium agglomeration during electrode cycling.

The state of the prior art of cadmium electrodes is also represented by the teaching of Japanese patent publication no. 54-106830 (assigned to Furukawa and reported in CA 92:8884m). According to that reference a paste consisting of cadmium oxide or cadmium hydroxide and a binder is applied on to a porous sheet coated with thermally fusible nylon grains. The pasted sheet is then dried and conversion treated to prepare cadmium anodes. Nylon grains of 0.2-0.4 mm are disclosed as being blown onto a nickel-plated iron sheet, and a paste consisting of cadmium hydroxide, nickel powder, short fibers, poly (vinyl) alcohol, carboxymethyl cellulose, and water is applied to the nylon-coated sheet with a reported reduction in the percentage of defective electrodes produced. It is believed the nylon serves as a binder to promote cohesion between the active material and substrate.

Yet another effort to address the problem of binding as well as agglomeration in cadmium electrode structures includes a copending U.S. application Ser. No. 07/382,816, filed Jul. 19, 1989, now U.S. Pat. No. 5,064,735 entitled "Cadmium Electrode and Process for its Production", which application has a partially common inventorship as well as a common assignee with the subject application, the contents of which are specifically incorporated herein by reference. In this disclosure, a cadmium electrode employs an anti-agglomerating material which also serves as a binder. This material is in a form of a micro-porous interconnecting polymeric network. The polymeric network is intimately admixed with the active cathode material in which it functions as an electrolyte wick to maintain the electrolyte at the active porous surfaces of the electrode retained in the polymeric network, during charge and discharge of the electrode.

While the above referenced polymeric network considerably enhances the anti-agglomeration characteristics of the disclosed cathode, there is still a desire for a cadmium electrode structure which is simple to construct and which provides significantly enhanced anti-agglomeration characteristics resulting in enhanced cell life and capacity.

SUMMARY OF THE INVENTION

Accordingly, it is one object of the present invention to provide a cadmium electrode for use in a rechargeable cell which exhibits enhanced cadmium anti-agglomeration characteristics.

It is another object of the present invention to provide a cadmium electrode for use in a rechargeable cell which has a significantly increased cycle life.

Yet another object of the present invention is to provide an improved cadmium electrode for use in rechargeable cells having enhanced initial capacity. A further object of the present invention is to provide a secondary electrochemical cell incorporating a cadmium negative electrode which is significantly less susceptible to cadmium agglomeration.

To achieve the foregoing and other objects and in accordance with the purpose of the present invention, as embodied and broadly described herein, a cadmium electrode is disclosed for use in a rechargeable cell employing an alkaline electrolyte. The electrode includes an electrically conductive substrate supporting an electrochemically active cadmium material. An effective amount of a nonionic, water soluble glycoside-based surfactant is included in the electrode to retard cadmium agglomeration during operation of the electrode. In addition, a rechargeable electrochemical cell is disclosed employing such a cadmium negative electrode having anti-agglomeration characteristics as a result of the addition of an effective amount of the glycoside-based surfactant.

In yet another embodiment of the invention, a process for producing cadmium negative electrodes for rechargeable cells is disclosed. The process includes forming a mixture by blending together a binder, an electrochemically active cadmium material, and an effective amount of a nonionic, water soluble glycoside-based surfactant to retard cadmium agglomeration during operation of the electrode. This mixture is then applied to an electrically conductive substrate to form a coated substrate, and the substrate is then dried thereby forming a cadmium and negative electrode. In one embodiment process, the substrate is dipped into this mixture, while in another embodiment the substrate is impregnated by continuously applying a coating to the substrate. In yet another process embodiment, the initial mixture does not include the glycoside-based surfactant, and a pre-fabricated electrode having a porous structure is formed by applying a mixture including an electrochemically active cadmium material to a conductive substrate. A solution is formed including the nonionic glycoside-based surfactant in a water-alcohol solvent, and this surfactant solution is then applied to the pre-fabricated electrode to penetrate and wet the porous structure. The solvent is then removed thereby forming the cadmium negative electrode.

Yet another embodiment of the invention includes a process for producing an electrochemical cell having a cathode, an anode including an electrically conductive substrate supporting an electrochemically active cadmium material, and an alkaline electrolyte. The process includes assembling the cathode within a cell housing. A mixture which includes the electrochemically active cadmium material as applied to a conductive substrate to form a pre-fabricated anode having a porous structure. The cell electrolyte is then mixed with a nonionic, water and electrolyte soluble glycoside-based surfactant which surfactant retards agglomeration of the cadmium in the anode during cycling of the cell. This electrolyte-surfactant mixture is then placed into the cell, and the cell is then sealed. Upon operation of the cell, the glycoside-based surfactant penetrates the anode structure to provide its anti-agglomeration characteristics.

BRIEF DESCRIPTION OF THE DRAWINGS

The accompanying drawings which are incorporated in and form a part of the specification illustrate preferred embodiments of the present invention, and together with a description, serve to explain the principles of the invention. In the drawings.

DETAILED DESCRIPTION OF THE PREFERRED EMBODIMENT

The cadmium electrode of the invention will be described primarily in association with a nickel electrode as the counterpositive electrode or cathode, and principally in respect to the sealed nickel-cadmium alkaline cell of the well-known spiral wound configuration. It will be understood that the cadmium electrode of the invention, however, has broad utility in a variety alkaline galvanic cells with any suitable positive electrode such as mercury or silver, for instance, in addition to nickel. The cells may be of the sealed variety in which oxygen generated on charge and overcharge at the positive electrode is recombined by reduction at the negative electrode, or at an auxiliary electrode, or the cadmium electrode may be used and flooded (vented) cells as well. The configuration of the cell may be cylindrical, of the button type, bobbin construction, or prismatic parallelepiped as illustrative examples. In the most preferred embodiment of the invention, the cadmium electrode plate of the invention is spirally wound on a suitable mandrel with a counterpositive electrode, insulated from one another with interposed separate material, into the so-called jelly-roll plate and separator configuration.

Figure 1:
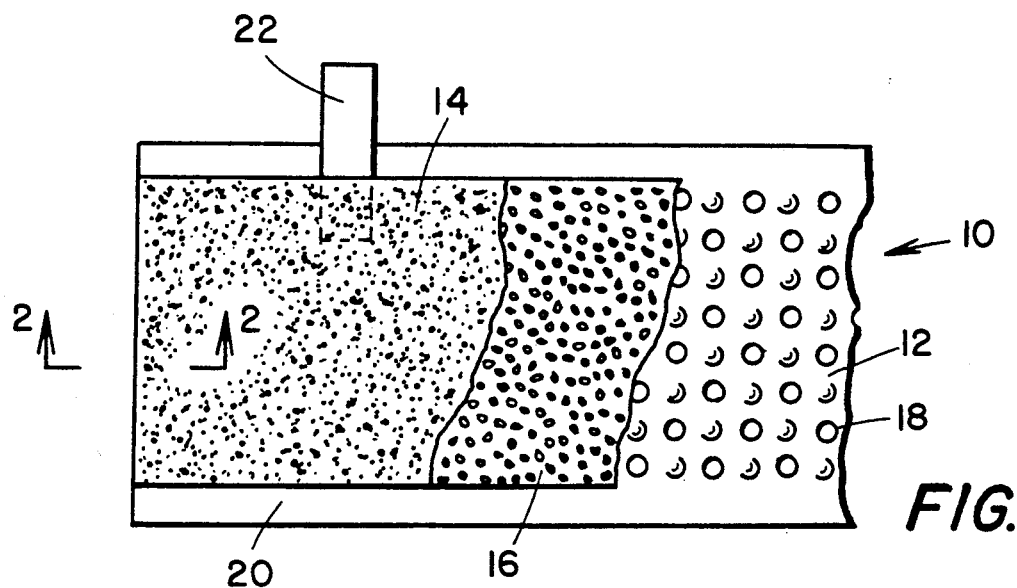
FIG. 1 is a side elevational, partially broken away view of a typical electrode structure useful with the present invention.
Figure 2:
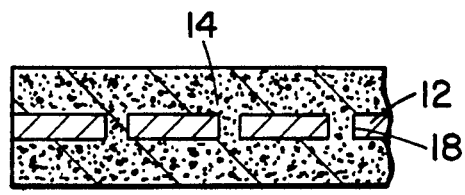
FIG. 2 is a partial sectional view of the electrode taken along line 2—2 of FIG. 1.
Figure 3:
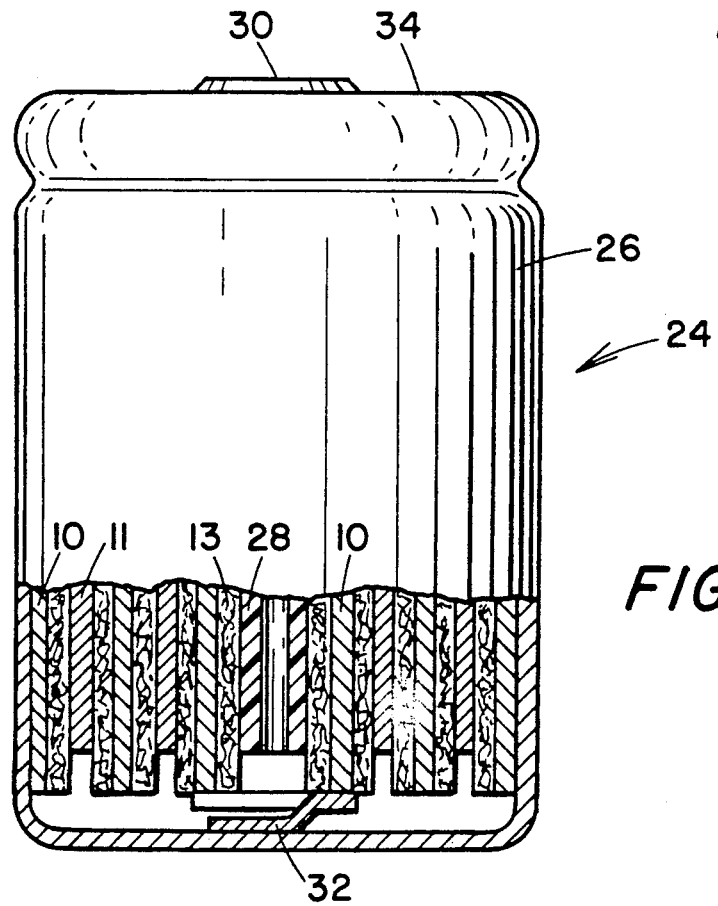
FIG. 3 is a schematic representation of a cylindrical sealed electrochemical cell employing the negative electrode of the present invention.

Referring with particularity to FIGS. 1-3, the cadmium electrode of the invention is shown generally at 10 and includes an electrically conductive substrate 12 on which is supported an electrochemically active material 14. The electrochemically active material 14 includes particulate electrochemically active cadmium material which, in one embodiment, may be retained in and dispersed through a binder network 16. The electrochemically active cadmium material makes electrical contact with this substrate 12 either directly or with the aid of alkaline electrolyte present in the electrode during charge and discharge of the electrode within a cell 24.

The electrically conductive substrate 12 may be formed of any suitable electrically conductive material compatible with the components of the cell 24 and may be configured as desired. Preferably, the substrate 12 is foraminous, in such forms as perforated nickel-plated steel sheet having a plurality of perforations 18 as illustrated, or in such alternative forms as woven wire screen, expanded mesh, foam metal, non-woven metal fibers, sintered metal plaque or the like, or combinations thereof. The surface of the substrate 12 may be stippled or embossed as illustrated to enhance bonding. If a foam metal or sintered structure is employed with or without an associated sheet substrate 12, the porous structure of the foam or plaque preferably should be such as to readily accommodate impregnation, pasting or the like of the active material interstices.

The substrate 12 not only supports the active mass within its perforations 18 or other interstices, but also preferably supports a layer of the active mass 14 on either or both major faces of the substrate 12. The substrate 12 may also be provided with a solid margin or border 20 on one or more of the edges which is free of active material to accommodate electrical connections to one of the terminals of the cell 24 in which the electrode is utilized. For this purpose, an optional current collector tab 22 may also be used, or in lieu of the border 20, as is well known in the art.

The active electrode material 14 supported on the substrate 12 includes a mixture of particular electrochemically active cadmium material, by which is meant to include cadmium metal particles and cadmium oxide particles in a predetermined proportion. In one preferred embodiment, this proportion includes about 0-15 percent by weight metallic cadmium and about 85-100 percent by weight cadmium oxide, although such proportions may be varied in accordance with principles well known in the art.

An example of the type of secondary cell, preferably a Ni-Cd alkaline cell, in which the cadmium electrode 10 in the form of an anode plate may be incorporated is illustrated in FIG. 3 generally at 24. The cell 24 includes an outer conductive casing 26 forming the negative terminal of the cell. Within this cylindrical coring 26 is mounted an optional winding spindle 28 formed from suitable insulating material and having spirally wound thereon in the familiar jelly-roll form an assembly consisting of cadmium negative plate 10 of the invention, a positive plate or cathode 11, and a porous insulating separator 13 sandwiched between the positive and negative plates. The positive plate 11 which is insulated from the casing 26 is electrically connected to a positive output terminal 30 through a tab connection (not illustrated). To prevent short-circuiting between the edges of the positive plate 11 and the cell casing 26, an annular insulating disk (not illustrated) may be provided above the top of the roll at the upper portion thereof as known in the art. In the bottom portion of the cell preferably cadmium plate 10 and separator 13 preferably extend beyond the edges of the positive plate 11 for insulation therefrom. The negative plate 10 is connected to the cell casing 26 through a lead 32, suitably attached by welding or the like to the marginal edges 20 of the negative plate 10.

A suitable safety release valve (not illustrated) may also be provided in the cap 34 of the cell 24 adjacent the terminal 30. Such a safety release valve permits release of pressure during abnormal operation of the cell 24, such as excessive overcharging.

An alkaline electrolyte, preferably potassium hydroxide at a suitable concentration such as 31 percent by volume, is impregnated in the pores of the plates 10, 11 and separator 13, being fully absorbed therein. The full pore volume of the plates and separators is not filled with the electrolyte in the cell 24 to thereby establish the well-known starved electrolyte condition satisfactory for ionic conduction as well as ready oxygen transport from the positive plate 11 to the cadmium negative plate 10, where the oxygen is reduced. Because of this internal recombination of oxygen gas during the charging and overcharging operations, the cell 24 is normally sealed and may be charged and discharged in any indiscriminate attitude without loss of electrolyte.

Referring back to FIG. 1, electrochemically active cadmium material mixture 14 may be retained in and dispersed throughout a binder matrix 16 formed from any number of well-known binders such as Teflon, polyamides as disclosed in copending application Ser. No. 07/274,262 previously referenced and incorporated, or the like. Such binder helps to hold the active material to the substrate 12 as well as provide a wicking capability for the electrolyte to the active cathode material surface.

One of the common problems with electrodes utilizing active cadmium material is that of the tendency of the cadmium active material, in particular cadmium hydroxide as well as particulate cadmium metal, to agglomerate over its cycle life. This is detrimental to the functioning of the cell since the agglomeration tends to increase the density of the cathode material as well as reduce the surface area or porosity. These effects inhibit or reduce the amount of contact between the active cathode material and the electrolyte, thereby reducing capacity of the cell. Consequently, numerous different attempts have been made through a variety of different vehicles to reduce the agglomeration tendency of cathode material in electrochemical cells.

Figure 4:
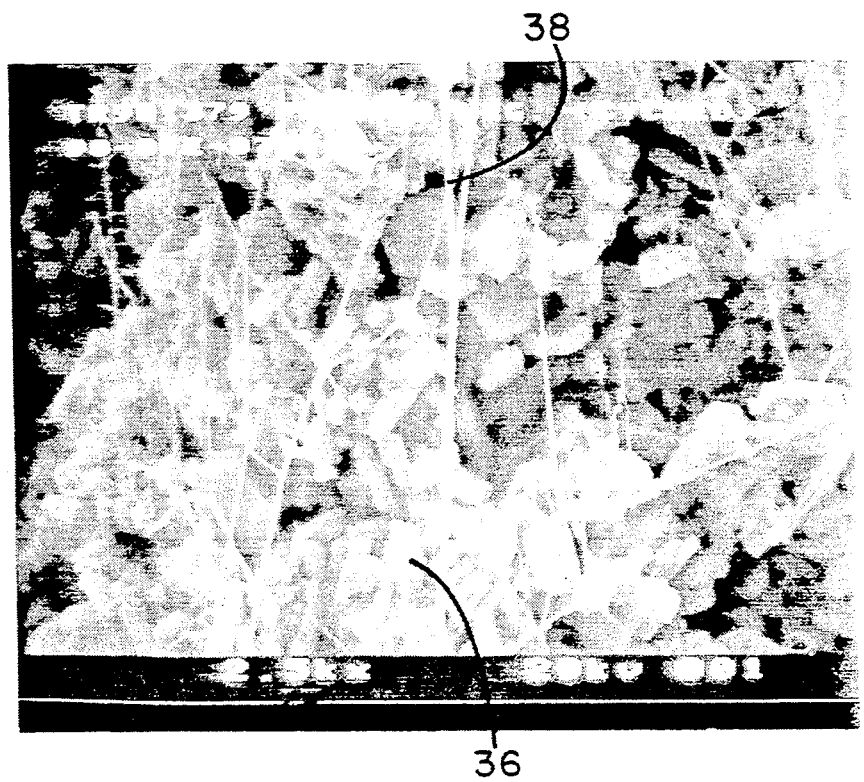
FIG. 4 is a scanning electron photomicrograph at 2500× of the active cadmium material of a cycled electrode constructed without the benefit of the present invention, ie., in accordance with prior art techniques.
Figure 5:
FIG. 5 is a scanning electron photomicrograh at 5000× of the same electrode illustrated in FIG. 4.

The previously referenced and copending U.S. application Ser. No. 07/382,816 is an example of such an attempt wherein the polyamide resin material therein functions both as a binder as well as an anti-agglomerant. However, agglomeration to various degrees has remained a problem. Referring to FIGS. 4 and 5, these FIGURES illustrate at two different powers of magnification the formation of large, hexagonal-type crystals 36 as a result of the agglomeration tendency of particulate cadmium and cadmium hydroxide over cycle life. The stringy type of objects 38 is Teflon binder which become very apparent and very pronounced when the cadmium hydroxide agglomerates as illustrated in FIGS. 4 and 5. As a result of this agglomeration, it can be readily seen that the surface area of the cadmium active material is reduced, thereby reducing porosity, increasing density and limiting the accessibility of interaction between electrolyte and cadmium active material at surfaces thereof.

Figure 6:
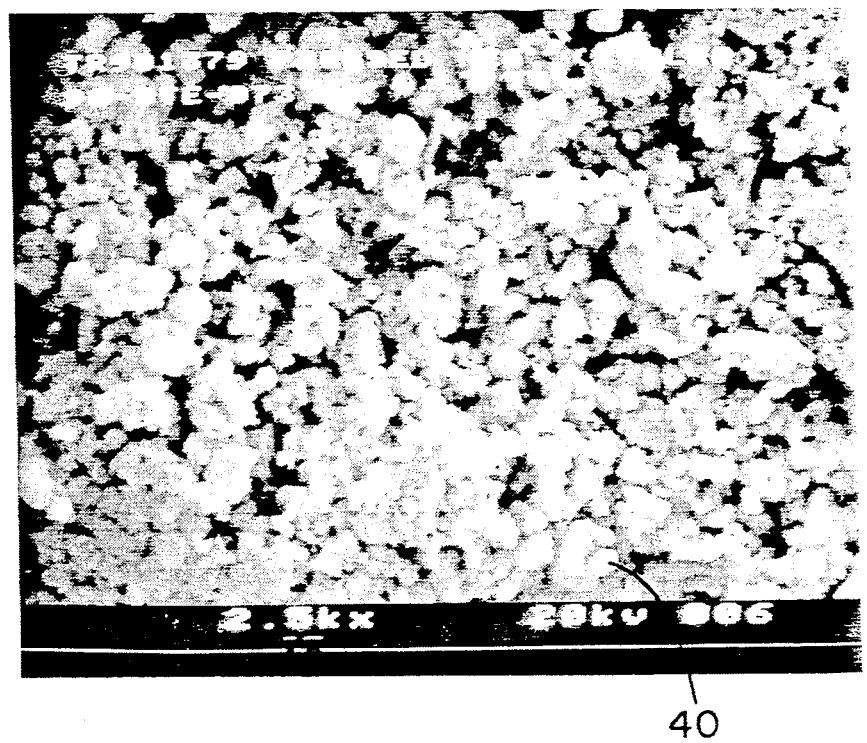
FIG. 6 is a scanning electron photomicrograph at 2500× of the active cadmium material of a cycled electrode constructed in accordance with the present invention.
Figure 7:
FIG. 7 is a scanning electron photomicrograph at 5000× of these electrodes illustrated in FIG. 6.

In accordance with one aspect of the present invention, it was discovered that the addition of an effective amount of a glycoside-based surfactant to the cadmium electrode had a profound effect on the morphology of the cadmium material during cycle life. In fact, the addition of this surfactant to the electrode retarded the growth of the cadmium hydroxide crystals by agglomeration and thus retarded the agglomeration process during cycle life of the electrode, thereby functioning as an anti-agglomerant. Referring to FIGS. 6 and 7, photomicrographs of two different powers of magnification illustrate the morphological structure of the cadmium electrode after cycling which has been treated with the surfactant of the present invention. As can be clearly seen, the cauliflowerlike nodules 40 are substantially smaller than the crystals shown in FIGS. 5 and 6. In fact, the average particle size of the cathode material shown in FIGS. 4 and 5 with agglomeration was about 3.70 microns (443 samples) while the average particle size of the cathode shown in FIGS. 5 and 6 are treated with the present invention was only 1.13 microns, less than ⅓ the size of untreated electrode particles. Moreover, the cauliflower-like structure clearly shows significantly greater surface area than the smooth crystalline-like structures illustrated in FIGS. 4 and 5. Thus, the agglomeration process as shown in FIGS. 4 and 5 is significantly retarded by utilizing the surfactant of the present invention as clearly illustrated in FIGS. 6 and 7. Another aspect of this advantage is that the binder fibers 38 are not as nearly pronounced and separated in the cathode electrode structure exposed to the surfactant of the present invention than when the surfactant is not used. This can be clearly seen when comparing the photomicrographs of FIGS. 4 and 5 to those of FIGS. 6 and 7.

In preferred form, the glycoside-based surfactant of the present invention may be selected from any of the known glycosides such as glucoside, mannoside, galactoside, idoside, altroside, and the like. The preferred glycoside is glucoside utilizing a glucose unit as a basis thereof. In addition, the glycoside may be combined with any of the well known alkyl or aryl groups or mixtures thereof but preferably is in the form of an alkyl glucoside. One preferred formulation of alkyl glucoside of the present invention is as indicated below:

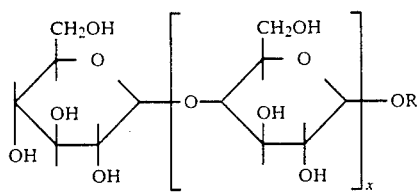

where an X is preferably 0 to 12 and R includes $C_2$-$C_{20}$ linear alkyl chains. In a more preferred embodiment, X ranges from 0 to 4 and R ranges from from $C_8$ to $C_{10}$ and, most preferably, R is a 50:50 ratio of $C_8$:$C_{10}$ linear alkyl chains. The alkyl compound may be selected from any one of the known alkyl compounds alone or may be any mixture or combination thereof. One particular preferred surfactant is available under the tradename TRITON CG-110 surfactant or TRITON BG-10 surfactant, both of which are trademarks of the Rhom and Haas Company.

The preferred surfactant is nonionic, water soluble, soluble in potassium hydroxide, and biodegradable. In preferred form, the surfactant of the present invention may be incorporated in the electrode by adding it directly to the electrolyte, adding it directly to the cadmium active material prior to or after the material has been positioned on the electrode substrate, or put into a plating dip to be deposited simultaneously with the cadmium and active material onto a substrate. It is believed that one of the important functioning aspects of the surfactant of the invention is its solubility in the electrolyte and its absorption on cadmium hydroxide and particulate cadmium. In preferred form, the effective amount of surfactant has been found to range from approximately 0.005 to about 0.5 percent by weight of the electrode excluding the weight of the substrate. More preferably, the effective amount comprises approximately 0.01–0.05 percent by weight, the amount being sufficient to effectively retard agglomeration of the cadmium-active material during cycling of the electrode.

The surfactant of the present invention is useful with virtually any type of negative cadmium electrode. It is useful with a pressed negative electrode, with an RNE (replacement negative or extruded) electrode as disclosed in the aforementioned copending application, in an elastomer-bonded negative electrode, as well as in a sintered electrode.

It has been found that by adding the surfactant of the present invention to the cadmium electrode, the present invention helps to increase the upfront or start-up capacity of the cell as well as to substantially increase, up to double, the cycle life of the electrode when used in an electrochemical cell as compared to the same electrodes without the presence or use of the surfactant of the invention. Moreover, any other additional materials used in conjunction with the active cadmium material, such as binders, enhancers and other materials such as nickel hydroxide and the like, have no effect one way or another on the functioning of the surfactant to retard agglomeration. Thus, the present invention can be utilized with virtually any type of cadmium electrode or electrochemical cell utilizing a cadmium electrode to significantly reduce agglomeration and increase the cycle life thereof.

EXAMPLE I

A pressed negative electrode was constructed and impregnated with a surfactant of the present invention by a dipping process. More particularly, approximately 0.937 grams of the most preferred alkyl glucoside surfactant as described above was placed into a container, and approximately 150 grams of deionized water was added to dissolve the water soluble surfactant material. Then, approximately 350 grams of N-propanol was admixed with this solution to provide a surfactant mixture. A pressed negative electrode was then fully submerged in the surfactant solution for approximately five seconds, removed, and the excess solution wiped off. The solution weight absorption by the electrode was in the 2.0–2.1 gram range. The electrode was then air dried for approximately 10–30 minutes and then oven dried at 100° C. for 3-4 minutes. The 2.0-2.1 grams of solution pickup was equivalent to 2.6-2.7 mg of 100 percent surfactant, and this resulted in about 0.023 percent by weight of surfactant in the electrode excluding the substrate weight. This electrode was then tested as described below.

A series of sealed cells were built having an excess of positive electrode capacity and electrolyte. These cells were therefore constructed to be negative limited so that the electrical data reflected negative electrode performance. The cells were of prismatic design with a central flat negative plate and two outer flat positive plates with a layer of conventional battery separator of nonwoven nylon fibers sandwiched between and pressed against the opposite plurality plates. The positive electrodes were of the sintered design, and a total capacity of the positives at 5C discharge rate was by design approximately 25 percent in excess of the negatives to be evaluated.

Figure 8:
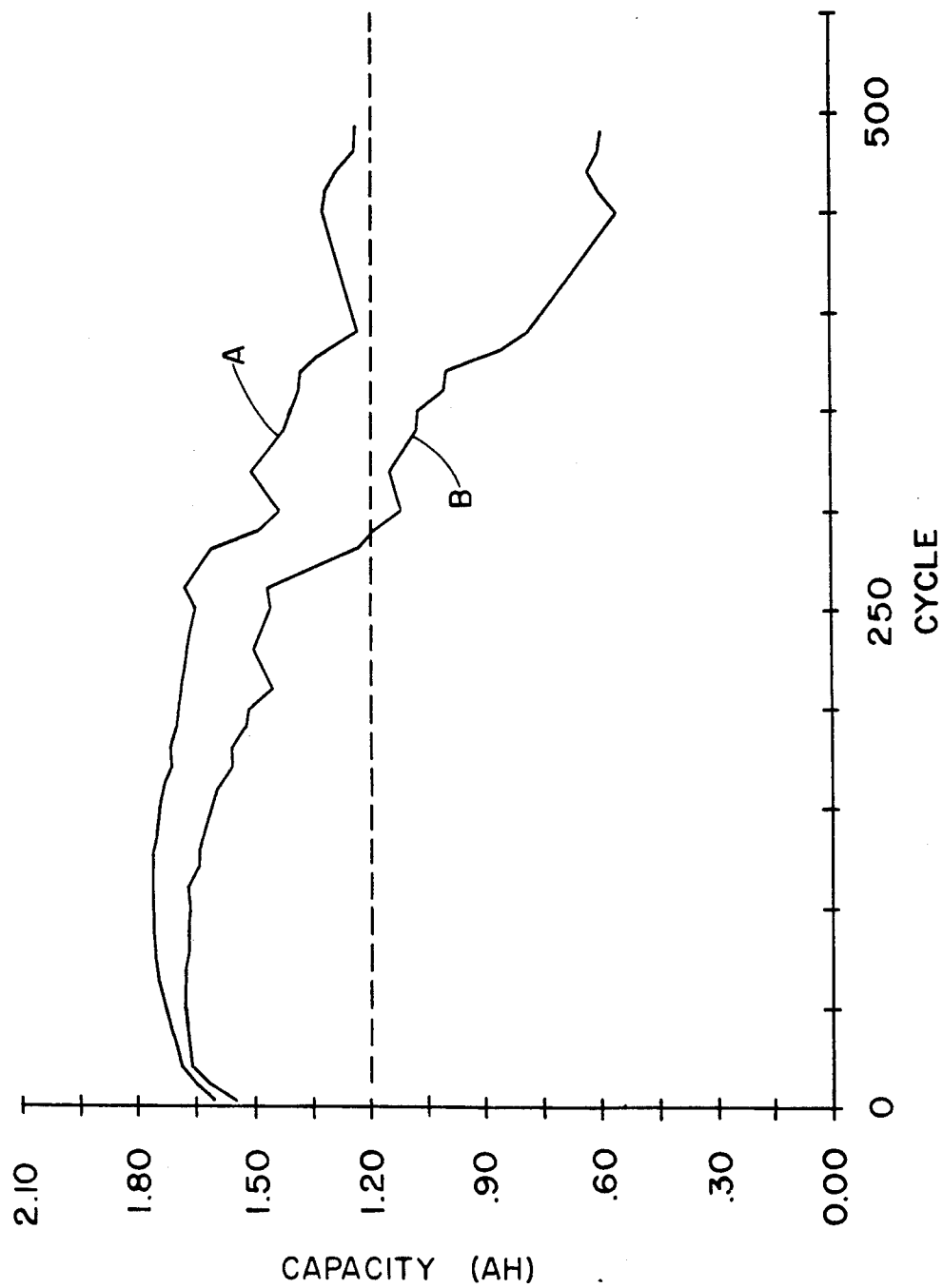
FIG. 8 is a graph plotting capacity of sealed nickel-cadmium cells vs. charge/discharge cycles comparing a prior art cell with a cell employing the electrode of the present invention.

Negative electrodes of the present invention as described herein were then tested for performance and cycle life against state of the art negative PTFE based-electrodes ("controls") without the glycoside-based surfactant additive. Referring to FIG. 8, the results of this test of the above-described negative electrode against the controls are illustrated. In this FIG. 8, line B represents the control while line A represents the cadmium negative electrode impregnated with the surfactant of the present invention. The line indicated at 1.20 Ah capacity is an arbitrary line to designate failure rate, which is 80 percent of the ready capacity at 1.50 Ah. The cell size was $C_5$, charges were at 1.0 A for 1.5 hours at 25 degrees C., and discharges were at 10.0 A at 0.6 volts at 25 degrees C. As can be seen from the above, the control cell failed slightly after 250 cycles, while the cell incorporating the electrode of the present invention continued to operate and function at capacity above the arbitrary 80 percent failure rate well beyond 500 cycles. Thus, the present invention virtually doubled the cycle life of the electrochemical cell tested.

EXAMPLE II

For this particular example, sealed wound nickel cadmium cells were prepared. All cells had a common lot of positive electrodes and separator. The only differences between cells of the invention and the control cells were in the construction of the cadmium negative electrodes. The positive electrodes were standard nickel hydroxide/nickel hydrate impregnated in sintered nickel substrate of about 80 percent porosity. In this particular example, approximately 340 grams of blended cadmium oxide/cadmium hydroxide with water residue was admixed with 3.3 grams of Dupont T-30 Teflon binder and 0.15 grams of the preferred alkyl glucoside surfactant described above. This mixture was then applied to a suitable substrate and dried with the total weight of the mix being approximately 305 grams. This ended up representing 0.043 percent by weight of surfactant in the cadmium electrode less the substrate weight.

Figure 9:
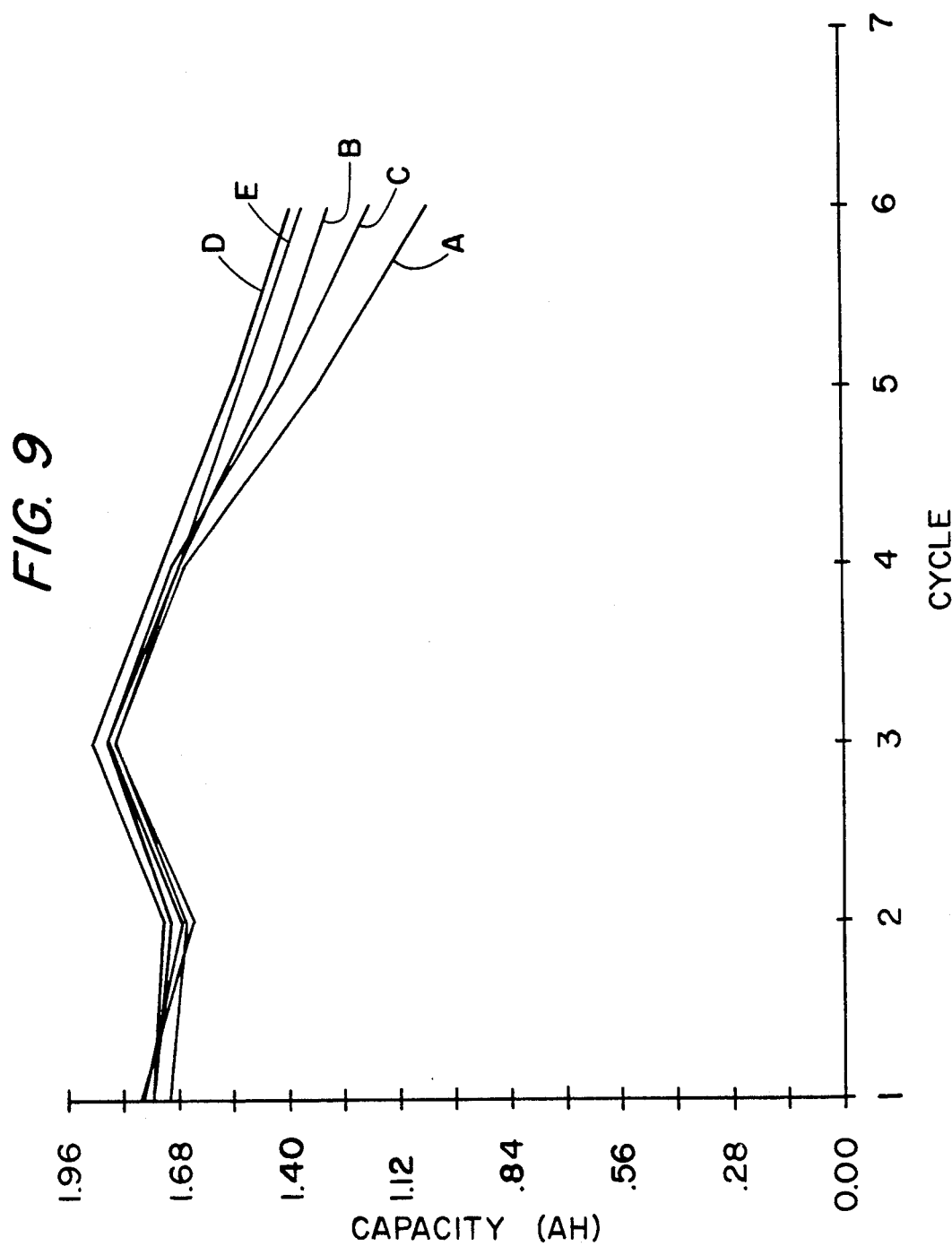
FIG. 9 is a graph plotting capacity of sealed nickel-cadmium cells vs. initial charge/discharge cycles, comparing a prior art cell with cells using known electrodes treated in accordance with the present invention.

Referring to FIG. 9, the cell of this Example II. is indicated by curve B while the control is indicated by curve A. As can be seen from this example, the initial capacity during the first few cycles of the cell is significantly enhanced by use of the surfactant of the present invention. Thus, Example I. verifies the fact that the present invention will substantially increase cycle life, while this particular example and examples to follow clearly indicate that the present invention also significantly enhances capacity during initial start up similar to a precharge.

EXAMPLE III

In this particular example, an RNE (extruded) electrode was prepared. This electrode was prepared by first blending a mixture of 8.0 grams Henkel 6200 nylon binder, 8.96 grams nickel hydroxide, 10.0 grams zinc oxide, 40.0 grams cadmium particulate metal, 732.64 grams cadmium oxide, and 0.40 grams of the most preferred alkyl glucoside as described above. This mixture was blended together and then applied to a suitable substrate and dried. The total weight of the above mixture was 800 grams dry, and the alkyl glucoside represented 0.035 percent by weight of the electrode without the substrate. This electrode was then tested against the control under C/10 cycle life test with a discharge of approximately 10.0 A to 0.8 volts. The cell utilized in the present invention operated at a level of approximately 120 percent Ah of the control. Thus, the surfactant of the present invention significantly enhanced capacity of the cell during initial cycle life, similar to that of Example II., but in this instance over the first 50 or so cycles.

EXAMPLE IV

In this particular example, the surfactant of the present invention was added to the electrolyte to be used in the test cell. This mixture was then added to the cell, and the cell was then sealed. In this instance, a test cell as described above for Example II. was formed with a pressed negative electrode, and approximately 3 mg of the most preferred glycoside-based surfactant was added to the cell. The cell included 30 percent potassium hydroxide in the electrolyte, and this amounted to approximately 0.065 percent by weight of the surfactant. This cell was then tested against control and is illustrated in FIG. 9 as line C. Again, this particular cell had enhanced upfront capacity as compared to the control as a direct result of including the surfactant of the present invention. Lines D and E represent other cells tested incorporating the surfactant of the present invention into the electrode paste and were tested under conditions similar to those set forth above in Example II. As can be seen from FIG. 9, the present invention significantly enhances the upfront capacity of the cell regardless of whether the surfactant is added directly to the cadmium negative electrode or is added to the electrolyte of the cell, which is then absorbed by the cadmium negative electrode during operation of the cell.

As can be seen from the above, the present invention enables a significant reduction or retardation in the agglomeration of cadmium active materials and the cadmium negative electrode of electrochemical cells. The present invention is simple to manufacture and represents only a small weight percent change to the electrode. However, the present invention significantly changes the morphological structure of the cadmium active material during the cycle life of the cadmium electrode so as to substantially enhance performance of the electrode and the cell utilizing the electrode. As a result, cadmium electrochemical cells, such as nickel-cadmium galvanic cells, may have their cycle life significantly enhanced as well as their upfront capacity increased merely by making a relatively simple change during the manufacturing process thereof by adding the surfactant of the present invention thereto. Consequently, the costs involved in modifying or changing existing cadmium production lines is minimal as well as the material costs involved per cell, since the amount of surfactant per cell is extremely small. However, the performance achieved as a result of the present invention is significant.

The foregoing description and the illustrative embodiments of the present invention have been shown in the drawings and described in detail in varying modifications and alternate embodiments. It should be understood, however, that the foregoing description of the invention is exemplary only, and that the scope of the invention is limited only to the claims as interpreted in view of the prior art.

What is claimed is:

1. A cadmium electrode for use in a rechargeable cell employing an alkaline electrolyte, said electrode comprising:
   an electrically conductive substrate supporting an electrochemically active cadmium material; and
   an effective amount of a nonionic, water soluble glycoside-based surfactant to retard cadmium agglomeration during operation of said electrode.

2. The electrode as claimed in claim 1, wherein said surfactant is dispersed within the electrochemically active material.

3. The electrode as claimed in claim 1, wherein said surfactant is selected from the group consisting of alkyl or aryl glycosides or mixtures thereof.

4. The electrode as claimed in claim 1, wherein said surfactant comprises a glucoside-based glycoside.

5. The electrode as claimed in claim 1, wherein said surfactant comprises an alkyl glucoside wherein the alkyl component of said alkyl glucoside may be selected from one or more different alkyl groups.

6. The electrode as claimed in claim 5, wherein said effective amount of surfactant is from about 0.005 to about 0.5 percent by weight of the electrode excluding the substrate thereof.

7. The electrode as claimed in claim 6, wherein said effective amount comprises about 0.01-0.05 percent by weight.

8. The electrode as claimed in claim 5, wherein said alkyl glucoside comprises an alkyl component having up to 20 carbon atoms.

9. The electrode as claimed in claim 8, wherein said alkyl component comprises from eight to ten carbon atoms.

10. The electrode as claimed in claim 9, wherein said alkyl component comprises a 50:50 ratio of $C_8$:$C_{10}$.

11. The electrode as claimed in claim 8, wherein said alkyl glucoside comprises a glucose component of up to twelve glucose units.

12. The electrode as claimed in claim 1, wherein said effective amount of surfactant retards cadmium agglomeration in a sufficient amount to substantially increase the cycle life and initial capacity of said electrode.

13. In an electrochemical cell having a cathode, an anode including an electrically conductive substrate supporting an electrochemically active cadmium material, and an alkaline electrolyte, the improvement wherein said cell further comprises an effective amount of a nonionic, water soluble glycoside-based surfactant to retard cadmium agglomeration at said anode during operation of said cell.

14. The electrochemical cell as claimed in claim 13 wherein said surfactant is selected from the group consisting of alkyl or aryl glycosides or mixtures thereof.

15. The electrochemical cell as claimed in claim 13, wherein said surfactant comprises a glucoside-based glycoside.

16. The electrochemical cell as claimed in claim 13, wherein said surfactant comprises an alkyl glucoside.

17. The electrochemical cell claim 13, wherein said glycoside-based surfactant is dissolved in said electrolyte.

18. The electrochemical cell of claim 13, wherein said glycoside-based surfactant is dispersed within said electrochemically active cadmium material.

19. The electrochemical cell of claim 16, wherein said effective amount of alkyl glucoside surfactant is from about 0.005 to about 0.5 percent by weight of the anode excluding the substrate thereof.

20. The electrochemical cell of claim 19, wherein said effective amount of surfactant comprises approximately 0.01-0.05 percent by weight.

21. The electrochemical cell of claim 16, wherein said alkyl glucoside includes an alkyl component comprising up to 20 carbon atoms.

22. The electrochemical cell of claim 21, wherein said alkyl component comprises from eight to ten carbon atoms.

23. The improvement of claim 21, wherein said alkyl glucoside includes a glucose component comprising up to five glucose units.

24. A process for producing a cadmium negative electrode for a rechargeable cell comprising the steps of:
   forming a mixture by blending together a binder, an electrochemically active cadmium material, and an effective amount a nonionic, water soluble glycoside-based surfactant to retard cadmium agglomeration during operation of the electrode;
   applying said mixture to an electrically conductive substrate to form a coated substrate; and
   drying said coated substrate.

25. The process as claimed in claim 24, wherein said surfactant is selected from the group consisting of alkyl or aryl glycosides or mixtures thereof.

26. The process as claimed in claim 24, wherein said surfactant comprises a glucoside-based glycoside.

27. The process as claimed in claim 24, wherein said surfactant comprises an alkyl glucoside.

28. The process as claimed in claim 27, wherein said effective amount of surfactant is from about 0.005 to about 0.5 percent by weight of the electrode excluding the substrate thereof.

29. The process as claimed in claim 27, wherein said alkyl glucoside comprises an alkyl component of from eight to ten carbon atoms and a glucose component of up to five glucose units.

30. The process as claimed in claim 24, wherein said electrically conductive substrate is dipped into said mixture to form said coated substrate.

31. The process as claimed in claim 24, wherein said mixture is applied to the substrate through extrusion by passing the substrate through a coating guide through mixture is continuously supplied.

32. A cadmium electrode produced in accordance with the process of claim 24.

33. A rechargeable alkaline cell comprising the electrode of claim 1.

34. A process for producing a cadmium negative electrode for a rechargeable cell comprising the steps of:
 applying a mixture including an electrochemically active cadmium material to a conductive substrate to form a pre-fabricated electrode having a porous structure;
 forming a solution of a nonionic glycoside-based surfactant in a water and alcohol solvent mixture which surfactant retards agglomeration of the cadmium material during cycling of the rechargeable cell;
 applying said surfactant solution to the pre-fabricated electrode to penetrate and wet at least a portion of the porous pre-fabricated electrode structure; and
 removing said solvent mixture.

35. A process of claim 34, wherein said surfactant, comprises a glucoside-based glycoside.

36. The process as claimed in claim 34, wherein said surfactant comprises an alkyl glucoside.

37. The process of claim 36, wherein said effective amount of surfactant is from about 0.005 to about 0.5 percent by weight of the electrode excluding the substrate thereof.

38. The process of claim 36, wherein said alkyl glucoside comprises an alkyl component of from eight to ten carbon atoms and a glucose component of up to five glucose units.

39. The process of claim 34, wherein said water and alcohol solvent comprises an alcohol of a low molecular weight in sufficient amounts to reduce the surface tension of the liquid in said mixture to enhance air removal from said prefabricated electrode when said solution is applied thereto.

40. The process of claim 39, wherein said water and alcohol solvent comprises at least ten percent alcohol.

41. The process of claim 34, wherein said surfactant solution is applied to said electrode by dipping said pre-fabricated electrode into said surfactant solution for sufficient time to permit penetration by said solution and to permit the removal of air from said electrode.

42. A process for producing an electrochemical cell having a housing, a cathode, an anode including an electrically conductive substrate supporting an electrochemically active cadmium material, and an alkaline electrolyte said process comprising the steps of:
 assembling a cathode within the housing of said cell;
 applying a mixture including said electrochemically active cadmium material to a conductive substrate to form a pre-fabricated anode having a porous structure;
 admixing said electrolyte with a nonionic, water and electrolyte soluble glycoside-based surfactant, which surfactant retards agglomeration of the cadmium in the anode during cycling of the cell; and
 adding the mixture of said electrolyte and surfactant to said cell.

43. The process as claimed in 42, wherein said surfactant is admixed with said electrolyte in situ within said cell.

44. The process as claimed in claim 42, wherein said glycoside-based surfactant is soluble in potassium hydroxide.

45. The process as claimed in claim 42, wherein said surfactant comprises an alkyl glucoside.

46. The process as claimed in claim 45, wherein said alkyl glucoside comprises an alkyl component of from eight to ten carbon atoms and a glucose component of up to five glucose units.

* * * * *